United States Patent [19]
Lundqvist et al.

[11] Patent Number: 6,064,888
[45] Date of Patent: May 16, 2000

[54] METHOD AND SYSTEM FOR DETERMINING POSITION OF MOBILE RADIO TERMINALS

[75] Inventors: Patrik Lundqvist, Stockholm; Hans Grubeck, Solna; Bengt Bergkvist, Jarfalla, all of Sweden; Sven Fischer, Nuremberg, Germany

[73] Assignee: Telefonaktiebolaget L M Ericsson (publ), Stockholm, Sweden

[21] Appl. No.: 08/978,912

[22] Filed: Nov. 26, 1997

[51] Int. Cl.⁷ .................... H04Q 7/00; H04Q 7/24
[52] U.S. Cl. ............ 455/456; 455/457; 455/440; 455/441
[58] Field of Search .................... 455/456, 440, 455/441, 457

[56] References Cited

U.S. PATENT DOCUMENTS

| | | | |
|---|---|---|---|
| 5,512,908 | 4/1996 | Herrick | 342/387 |
| 5,513,243 | 4/1996 | Kage | 455/456 |
| 5,608,410 | 3/1997 | Stilp et al. | 342/387 |
| 5,613,205 | 3/1997 | Dufour | 455/33.2 |
| 5,657,487 | 8/1997 | Doner | 455/456 |
| 5,666,662 | 9/1997 | Shibuya | 455/456 |
| 5,903,844 | 5/1999 | Bruckert et al. | 455/456 |

FOREIGN PATENT DOCUMENTS

| | | |
|---|---|---|
| 44 09 178 A1 | 9/1995 | Germany . |
| WO 92/05672 | 4/1992 | WIPO . |
| WO 96/25830 | 8/1996 | WIPO . |
| WO 97/27711 | 7/1997 | WIPO . |

OTHER PUBLICATIONS

U.S. application No. 08/894,466, Hagerman et al., filed Aug. 18, 1997.

U.S. application No. 08/978,960, Lundqvist et al., filed Nov. 29, 1997.

*Primary Examiner*—Daniel S. Hunter
*Assistant Examiner*—Alan T. Gantt
*Attorney, Agent, or Firm*—Jenkens & Gilchrist P.C.

[57] ABSTRACT

A method and system are disclosed for determining the distance between a radio receiver (RX) and a radio transmitter (TX) by uplink time measurements, whereby uplink messages are transmitted by the transmitter (TX) and used primarily for position determination. In one embodiment, the uplink messages are intra-cell handover messages if the transmitter (TX) is a component of a mobile radio terminal which is operating in accordance with an existing TDMA standard. In a second embodiment, the uplink messages are a new type of message transmitted in time slots not used by the mobile radio terminal and preferably, also not used by other mobile radio terminals in the system, if the transmitter (TX) is a component of a mobile radio terminal which is operating in accordance with a new or emerging TDMA standard. The evolving GSM radio air-interface standard is an example of such a TDMA standard.

38 Claims, 2 Drawing Sheets

METHOD AND SYSTEM FOR DETERMINING POSITION OF MOBILE RADIO TERMINALS

BACKGROUND OF THE INVENTION

1. Technical Field of the Invention

The present invention relates in general to the mobile radio communications field and, in particular, to a method and system for use in determining the geographical position of a mobile radio terminal.

2. Description of Related Art

Commonly-assigned U.S. patent application Ser. No. 08/894,466 to Hagerman et al., describes a method for determining the position of a mobile radio terminal (hereinafter mobile station or MS), which makes use of uplink Time of Arrival (TOA) and Direction of Arrival (DOA) measurements. Slight mention is made in that disclosure about repeating the same uplink signal a number of times, in order to improve the accuracy of the TOA determinations. However, the disclosure does not provide any details about how this improvement can be achieved.

Commonly-assigned U.S. patent application Ser. No. (Attorney docket no. 27946-00354), which has been filed on the same day as the present application, discloses a method and system for processing a repeatedly transmitted uplink signal to determine the position of a MS. The present invention is related by subject matter to the above-described Patent Applications and teaches how to provide the uplink signal transmitted from the MS in an advantageous way. In other words, the present invention teaches how to provide a "prime" uplink signal.

SUMMARY OF THE INVENTION

A problem addressed by the present invention is how to provide in a mobile radio system a number of identical "prime" digital signals to transmit repeatedly on the uplink from a radio transmitter (TX) in a MS whose position is to be determined. A radio receiver (RX) in each of at least three base stations (BSs) is able to receive the repeated "prime" digital signals on the uplink, and thereby determine a TOA relative to a time reference or a Time Difference of Arrival (TDOA) relative to a different received signal. At a minimum, the present invention addresses this and other related problems for Time Division Multiple Access (TDMA) and Frequency Division Multiple Access (FDMA) systems.

Another problem addressed by the present invention is how to provide the above-described "prime" signals if the MS whose position is to be determined is a conventional MS operating in accordance with an existing technical standard, a new MS operating in accordance with a new or emerging technical standard, an MS designed to improve the position determination procedure in accordance with the present invention, and/or at least two of these three types of MSs can co-exist and operate in the same system.

It is, therefore, an object of the present invention to provide a method and apparatus in at least a TDMA or FDMA system for generating "prime" signals in a MS whose position is to be determined.

It is another object of the present invention to provide a method and apparatus in at least a TDMA or FDMA system for generating "prime" signals in a MS whose position is to be determined, if the MS is operating in accordance with an existing technical standard.

It is yet another object of the present invention to provide a method and apparatus in at least a TDMA or FDMA system for generating "prime" signals in a MS whose position is to be determined, if the MS is operating in accordance with a new or emerging technical standard.

It is still another object of the present invention to provide a method and apparatus in at least a TDMA or FDMA system for generating "prime" signals in a MS whose position is to be determined, if the MS has been designed to improve the position determination procedure in accordance with the present invention.

The foregoing and other objects are achieved by a method and apparatus for use in at least a TDMA or FDMA system for generating "prime" signals in a MS whose position is to be determined, which includes ordering at least one base station to listen for a transmission from the MS and perform a measurement associated with determining the MS's position, sending an order from the serving base station to the MS to transmit at least one uplink signal, wherein the uplink signal(s) is primarily for use in the position measurement, the MS transmitting the uplink signal(s) on a frequency assigned to the serving base station, and the base station(s) performing the measurement associated with determining the MS's position.

An important technical advantage of the present invention is that the uplink signal used for time measurements in the case of an existing TDMA standard is an access burst transmitted during an intra-cell handover. For example, under the GSM standard, this access burst is the preferable uplink burst to use for time measurement purposes, because this access burst can be transmitted with maximum power, it is always continuous, it contains only reference information including an extended training sequence, and it does not require the use of any previously unassigned frequencies.

Another important technical advantage of the present invention is that the uplink signal used for time measurements in the case of a new or emerging TDMA standard (e.g., a modified version of the GSM) is a burst that can be transmitted from a MS in an unused time slot (TS) during a call on any carrier frequency assigned to the serving BS. Consequently, this uplink signal will not interrupt uplink traffic from the MS involved and also not disturb other MSs in the system.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, the present invention provides a method for making time measurements which can be used in determining the geographical position of a mobile radio terminal. As such, the time measurements involved can be TOA measurements or TDOA measurements. The following description discloses an embodiment of the invention wherein TOA measurements are preferably used.

Figure 1:
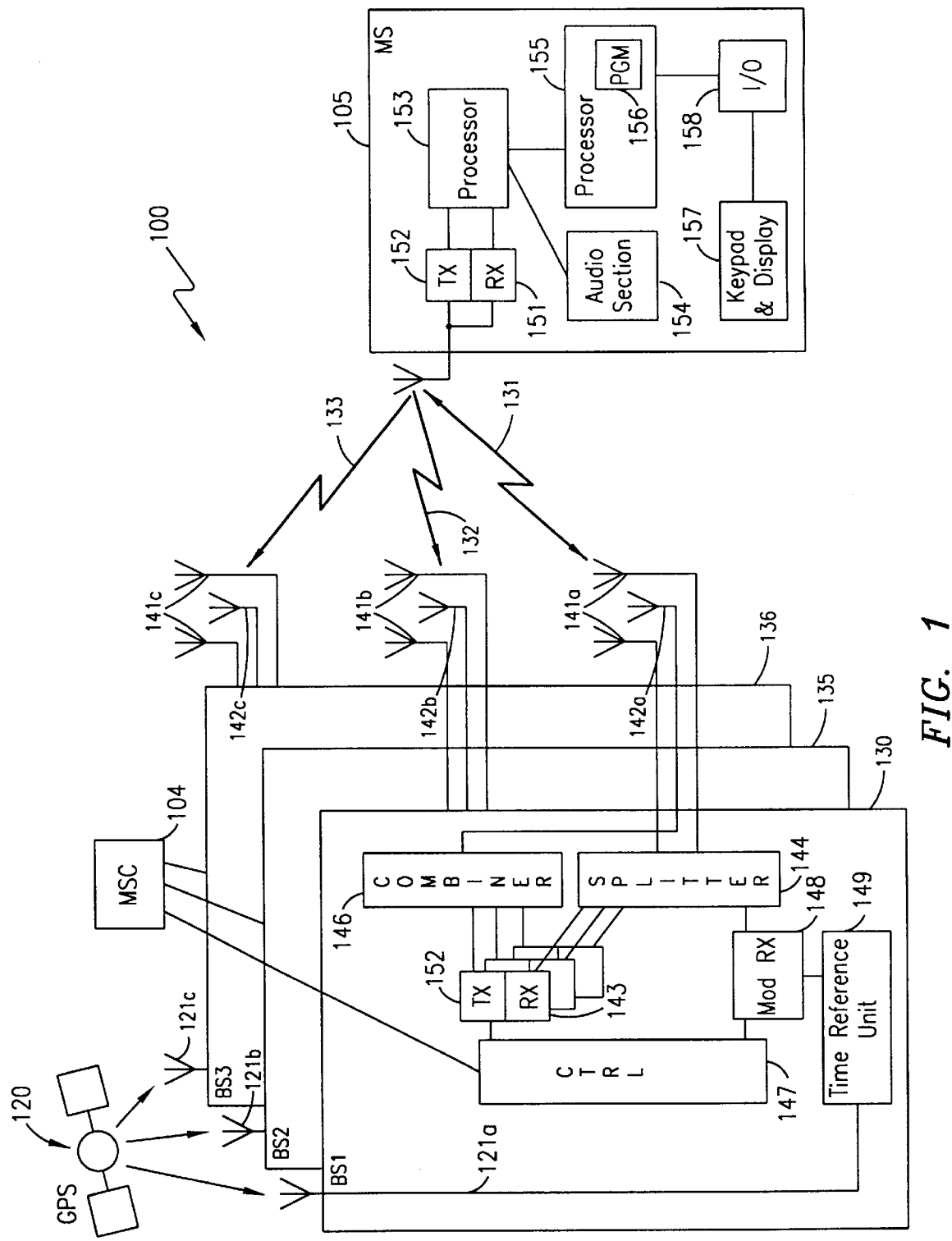
FIG. 1 is a schematic block diagram of a mobile radio system operable to determine the position of a mobile radio terminal, in accordance with a preferred embodiment of the present invention.

Specifically, FIG. 1 is a schematic block diagram of a mobile radio system operable to determine the position of a mobile radio terminal (MS), in accordance with a preferred embodiment of the present invention. The exemplary system 100 includes a plurality of radio base stations (e.g., BS1, BS2, BS3) 130, 135 and 136. Although only three BSs are shown, system 100 can include more than three such BSs. System 100 also includes a mobile services switching center (MSC) 104 coupled to the BSs, and at least one MS 105 whose geographical position is to be determined. FIG. 1 also shows an exemplary satellite 120 that can transmit an absolute time reference signal, such as a satellite from the known Global Positioning System (GPS).

For this embodiment, the radio base station BS1 (130) preferably functions as the serving BS for the MS 105. In other words, the serving base station BS1 communicates with the MS 105 via a traffic channel (TCH) over a radio link 131. In accordance with the present invention, the non-serving base stations BS2 and BS3 (135, 136) can participate in the position determination process by "listening" to the pre-announced special bursts which are transmitted from the MS 105 for position determination purposes. This "listening" function is represented by the unidirectional arrows 132 and 133.

Each radio BS 130, 135 and 136 preferably includes a respective set of receiving antennas (141a–c) coupled to a respective receiver section 143 via a splitter 144, and a transmitting antenna (142a–c) coupled to a respective transmitter section 145 via a combiner 146. Each BS also includes a controller section 147, which is coupled to the MSC 104, the transmitter section 145, the receiver section 143, and a modified receiver (ModRX) 148, which performs the measurements (e.g., TOA) associated with the position determinations being made. The ModRX 148 is coupled to a time reference unit 149, which receives timing signals from the satellite 120 via an antenna (121a). The ModRx 148, whose function and operation are described in the abovementioned U.S. patent application Ser. No. 08/894,466 to Hagerman et al., functions to measure the TOA (or TDOA) of the signals received from the MS 105, and report the results of those measurements to the MSC 104 via a connection to the controller section 147.

The MS 105 includes a receiver section 151 and transmitter section 152, which are coupled to a first processor 153. Preferably, processor 153 performs speech processing functions in MS 105. Processor 153 is coupled to an audio section 154, which can include a microphone and loudspeaker. Processor 153 is also coupled to a second processor 155, which can execute an application (e.g., software program) 156, which can be used to implement at least one embodiment of the present invention (e.g., for a modified MS) A keypad and display 157 for the MS are coupled to an input/output (I/O) section 158, which functions as a user interface for the MS 105 preferably via processor 155.

Figure 2:
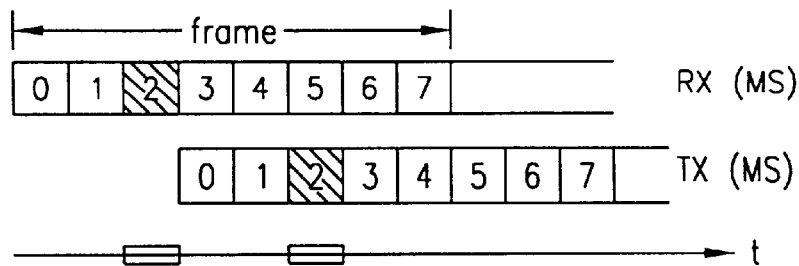
FIG. 2 illustrates frame timing in an MS whose position is to be determined, in accordance with the preferred embodiment of the present invention.

FIG. 2 illustrates frame timing in MS 105 whose position is to be determined, in accordance with a preferred embodiment of the present invention. The exemplary system 100 shown in FIG. 1 can operate in accordance with the GSM standard, wherein a frame comprises 8 time slots. The MS 105, whose position is to be determined, is preferably located (for the purpose of describing the timing of FIG. 2) nearby its serving BS (130) so that the timing advance (TA) used is equal to zero. Under these circumstances, the MS 105 receives on the downlink the time slot of its TCH, which can be assumed to be slot number 2 in FIG. 2, or three time slots prior to performing an uplink transmission. On the time axis shown in FIG. 2, time slots are indicated during which times the MS 105 is busy receiving or transmitting. In other words, these indications show the time slots that are not available for position determination transmissions on the uplink, if an ongoing call is not to be disturbed.

Figure 3:
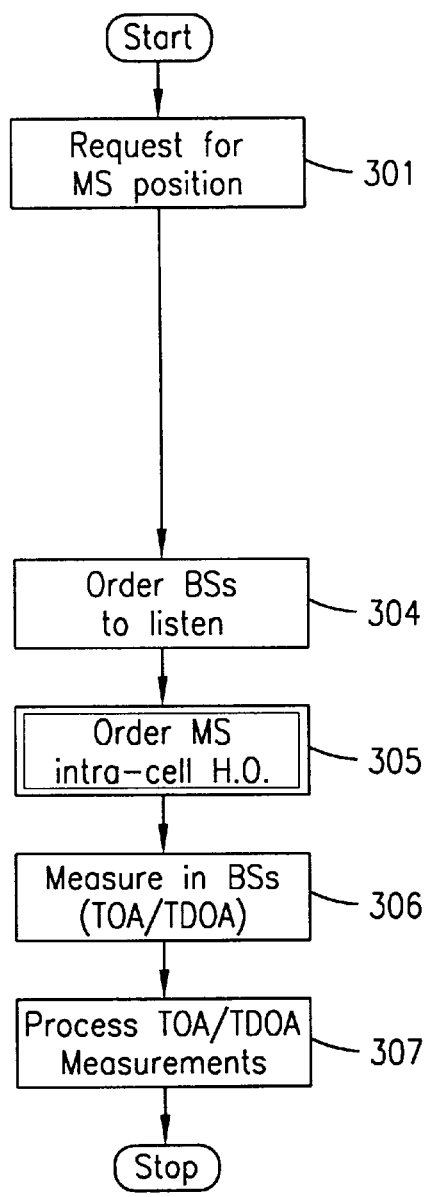
FIG. 3 is a flow diagram that can be used to implement an exemplary embodiment of the present invention.

FIG. 3 is a flow diagram that can be used to implement an exemplary embodiment of the present invention. FIG. 3 describes a method that can be used with an existing air-interface standard (e.g., the existing GSM standard) to advantageously utilize "prime" uplink signals for TOA (or TDOA) measurement purposes. Consequently, for this embodiment, the position determination function preferably employs TOA measurements based on uplink signals prescribed by the existing GSM standard, namely the uplink access bursts transmitted by the MS 105 to acknowledge an intra-cell handover order. As such, the method shown in FIG. 3 can be used to implement the present invention in accordance with the existing air-interface standard and the system 100 shown in FIG. 1.

At step 301, the system 100 (e.g., the network portion) receives a request to determine the position of a specified (existing standard) MS (MS 105 in this example). If the MS 105 is not already operating in the "conversational" mode, the network sets up a call to the MS, identifies the serving BS (130), and determines which of the other BSs (e.g., 135, 136) are to participate in the TOA measurements. At step 304, the serving BS (130) sends an order message via MSC 104, to the other BSs to be involved in the position determination (e.g., BS2-135, BS3-136), which orders BS2 and BS3 to "listen" to the access bursts transmitted from MS 105. This order message also indicates the TCH (carrier frequency and time slot) on which these BSs can expect to "hear" these access bursts from MS 105.

At step 305, the serving BS (130) transmits an intracell handover order message to MS 105 identifying a new TCH to be used. This new TCH can be one of the channels assigned to the serving BS (130), or it can even be the "old" TCH that is already being used. In other words, any available channel can be used for the new TCH. At step 306, the MS 105 transmits the access bursts ("prime" uplink signals) in response to the intra-cell handover order, in accordance with the existing air-interface specification (e.g., up to 70 special bursts at maximum power for the GSM). Upon receiving these access bursts, the ModRXs 148 in each of BSs 130, 135 and 136 perform their respective TOA measurements in accordance with the methods and apparatuses described in the above-mentioned, commonly-assigned U.S. patent application Ser. No. 08/894,466 to Hagerman et al, which is incorporated by reference herein in its entirety.

At step 307, the TOA measurements performed in step 306 are processed in order to determine the position of MS 105, in accordance with the methods and apparatuses described in the commonly-assigned, co-pending U.S. patent application Ser. No. (Attorney docket no. 27946-00354), which is incorporated by reference herein in its entirety.

Figure 4:
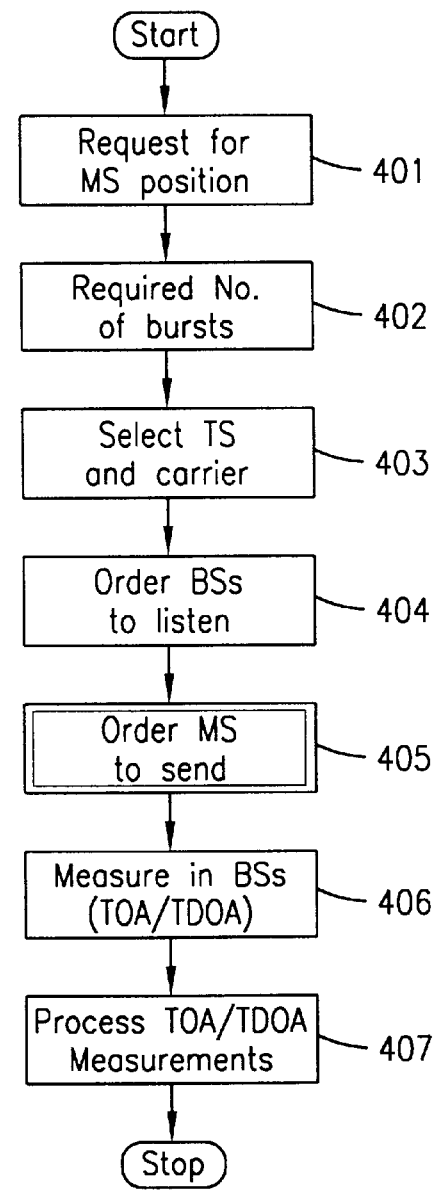
FIG. 4 is a flow diagram that can be used to implement a second exemplary embodiment of the present invention.

FIG. 4 is a flow diagram that can be used to implement a second exemplary embodiment of the present invention. FIG. 4 describes a method that can be used with an emerging or yet to be specified air-interface standard (e.g., a new GSM standard yet to be specified as of the date this application has been filed) to advantageously utilize "prime" uplink signals for TOA (or TDOA) measurement purposes. As such, the method shown in FIG. 4 has additional advantages over those of the method shown in FIG. 3, because the method of FIG. 4 enables determination of the position of a MS without incurring interruptions that can be caused by an intra-cell handover.

Referring to FIGS. 1 and 4, at step 401, the system 100 (e.g., the network portion) receives a request to determine the position of a specified MS (MS 105 in this example). A specified position determination accuracy can accompany the position determination request. For this embodiment, the specified MS is preferably a novel MS that has expanded functions and capabilities, which are compatible with the emerging or yet to be specified air-interface standard (e.g., a new or modified GSM standard). If the MS 105 is not already operating in the "conversational" mode, the network sets up a call to the MS 105, identifies the serving BS (130), and determines which of the other BSs (e.g., 135, 136) are to participate in the TOA measurements.

At step 402, the network (e.g., MSC 104) analyzes the request and operational conditions, and determines a number of access bursts and BSs needed to perform the position determination with an accuracy as requested. The network preferably performs this analysis to conserve the system load. However, this step is not intended to limit the scope of the present invention, and can be eliminated or modified, for example, to include one of either a minimum number of access bursts or minimum number of BSs needed (e.g., an operational consideration).

At step 403, the network (e.g., MSC 104) selects a time slot (TS) not being used by MS 105, and also selects a carrier frequency from among the carrier frequencies assigned to the serving BS 130. Preferably, the selected TS is idle on that selected carrier frequency. Notably, in order to perform this step, the MS 105 can interrupt Mobile Assisted Handover (MAHO) measurements if being performed. As such, these MAHO measurements are not considered to be an obstacle for the present inventive method of transmitting uplink access bursts for TOA (TDOA) measurements.

At step 404, the serving BS (130) sends an order message via MSC 104 (which contributes to this order), to the other BSs to be involved in the position determination (e.g., BS2-135, BS3-136), which orders BS2 and BS3 to "listen" to the access bursts transmitted from MS 105. This order message preferably also indicates the TCH (carrier frequency and time slot) on which these BSs can expect to "hear" these access bursts from MS 105, the frame number including the first of such access bursts, and the number of access bursts to be expected/measured.

At step 405, the serving BS (130) transmits a (novel) positioning order message to the MS 105, which preferably identifies an uplink TCH (time slot and carrier frequency) on which to convey a specified number of access bursts (with reference to step 402). This order message includes a frame number associated with the time at which the transmission of the bursts are to start. Alternatively, a plurality of bursts which are optimized for these position determination purposes can be ordered for transmission by the MS, instead of the above-described access bursts.

At step 406, the MS 105 transmits the bursts (according to the ordered type and number) starting at the ordered time (frame number). Upon receiving these bursts, the ModRXs 148 in each of BSs 130, 135 and 136 perform their respective TOA measurements in accordance with the methods and apparatuses described in the above-mentioned, commonly-assigned U.S. patent application Ser. No. 08/894,466 to Hagerman et al.

At step 407, the TOA measurements performed in step 406 are processed in order to determine the position of MS 105, in accordance with the methods and apparatuses described in the commonly-assigned, co-pending U.S. patent application Ser. No. (Attorney docket no. 27946-00354).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for use in determining a geographical position of a mobile terminal in at least a TDMA or FDMA mobile radio system, comprising the steps of:

receiving in said mobile radio system a request to determine said geographical position;

determining whether said mobile terminal is operating in a conversational mode, and if not, establishing a call with said mobile terminal;

attempting to ascertain an uplink time slot that is unused by said mobile terminal and a serving base station, and if successful, assigning said uplink time slot that is unused as a geographical position determining time slot, and if not successful, determining to interrupt unlink communication by assigning a time slot that is currently used by said mobile terminal as said geographical position determining time slot;

ordering at least one base station to listen for a transmission from said mobile terminal and to perform a measurement associated with said determining said geographical position;

sending an order from said serving base station to said mobile terminal to transmit at least one uplink signal at said geographical position determining time slot, said at least one uplink signal primarily for use in said measurement associated with said determining said geographical position;

said mobile terminal transmitting said at least one uplink signal on a frequency assigned to said serving base station and at said geographical position determining time slot; and said at least one base station performing said measurement associated with said determining said geographical position.

2. The method of claim 1, wherein said ordering step comprises ordering at least three base stations to listen for said transmission from said mobile terminal and to each perform a measurement associated with said determining said geographical position.

3. The method of claim 1, wherein said measurement comprises a time measurement.

4. The method of claim 1, wherein said at least one uplink signal is solely for use in said measurement associated with said determining said geographical position.

5. A method for use in determining a geographical position of a mobile terminal in at least a TDMA or FDMA mobile radio system, comprising the steps of:

receiving in said mobile radio system a request to determine said geographical position;

ordering at least one base station to listen for a transmission from said mobile terminal and perform a measurement associated with said determining said geographical position;

sending an order from a serving base station to said mobile terminal to transmit at least one unlink signal, said at least one unlink signal primarily for use in said measurement associated with said determining said geographical position;

said mobile terminal transmitting said at least one uplink signal on a frequency assigned to said serving base station;

said at least one base station performing said measurement associated with said determining said geographical position; and wherein said at least one uplink signal comprises an intra-cell handover access message.

6. The method of claim 5, wherein said intra-cell handover access message specifies a handover to an already utilized channel.

7. The method of claim 5 or 6, wherein said uplink signal comprises at least two intra-cell handover access messages responsive to a purposefully delayed acknowledgment to said uplink signal from said serving base station to said mobile terminal, said acknowledgment purposefully delayed in order for said at least one base station to receive additional uplink signals for use in performing measurements associated with said determining said geographical position.

8. The method of claim 7, wherein a purposeful delay is long enough for said mobile terminal to transmit a specified number of uplink signals, and after a time-out period, said mobile terminal reverts to a traffic channel utilized prior to said handover.

9. The method of claim 8, wherein said specified number of uplink signals is specified as a maximum number of uplink signals by a GSM radio air-interface specification.

10. The method of claim 1, wherein said mobile radio system comprises a TDMA system, and said at least one uplink signal is transmitted at said geographical position determining time slot, wherein said geographical position determining time slot is a time slot not used for traffic by said mobile terminal.

11. The method of claim 1, wherein the interrupted uplink communication is for mobile assisted handover (MAHO) measurements.

12. The method of claim 10, wherein said at least one uplink signal is transmitted on any frequency assigned to said serving base station.

13. The method of claim 1, wherein a start time and a stop time for said at least one uplink signal and a corresponding measurement are predetermined in order to minimize a system load.

14. The method of claim 13, wherein said start time and said stop time are defined by associated frame numbers.

15. A system for use in determining a geographical position of a mobile terminal in a mobile radio system, comprising:

means for receiving a request to determine said geographical position;

means for determining whether said mobile terminal is operating in a conversational mode and means for establishing a call with said mobile terminal responsive to a determination that said mobile terminal is not operating in a conversational mode by said means for determining;

means for attempting to ascertain an uplink time slot that is unused by said mobile terminal and a serving base station, and means for assigning said uplink time slot that is unused as a geographical position determining time slot responsive to ascertainment of an uplink time slot that is unused by said means for attempting to ascertain, said means for assigning determining to interrupt uplink communication and assigning a time slot that is currently used by said mobile terminal as said geographical position determining time slot responsive to a failure to ascertain an uplink time slot that is unused by said means for attempting to ascertain;

means for ordering at least one base station to listen for a transmission from said mobile terminal;

a modified receiver, coupled to said at least one base station, for performing a measurement associated with said determining said geographical position;

said serving base station operable to send an order to said mobile terminal to transmit at least one uplink signal at said geographical position determining time slot, said at least one uplink signal primarily for use in said measurement associated with said determining said geographical position; and said mobile terminal operable to transmit said at least one uplink signal on a frequency assigned to said serving base station at said geographical position determining time slot.

16. The system of claim 15, wherein said at least one base station comprises at least three base stations.

17. The system of claim 15, wherein said measurement comprises a time measurement.

18. The system of claim 15, wherein said at least one uplink signal is solely for use in said measurement associated with said determining said geographical position.

19. A system for use in determining a geographical position of a mobile terminal in a mobile radio system, comprising:

means for receiving a request to determine said geographical position and ordering at least one base station to listen for a transmission from said mobile terminal;

a modified receiver, coupled to said at least one base station, for performing a measurement associated with said determining said geographical position;

a serving base station operable to send an order to said mobile terminal to transmit at least one unlink signal, said at least one unlink signal primarily for use in said measurement associated with said determining said geographical position;

said mobile terminal operable to transmit said at least one uplink signal on a frequency assigned to said serving base station; and wherein said at least one uplink signal comprises an intra-cell handover access message.

20. The system of claim 19, wherein said intra-cell handover access message specifies a handover to an already utilized channel.

21. The system of claim 19 or 20, wherein said uplink signal comprises at least two intra-cell handover access messages responsive to a purposefully delayed acknowledgment to said uplink signal from said serving base station to said mobile terminal, said acknowledgment purposefully delayed in order for said at least one base station to receive additional uplink signals for use in performing measurements associated with said determining said geographical position.

22. The system of claim 21, wherein a purposeful delay is long enough for said mobile terminal to transmit a specified number of uplink signals, and after a time-out period, said mobile terminal operable to revert to a traffic channel utilized prior to said handover.

23. The system of claim 22, wherein said specified number of uplink signals is specified as a maximum number of uplink signals by a GSM radio air-interface specification.

24. The system of claim 15, wherein said mobile radio system comprises a TDMA system, and said at least one uplink signal is transmitted at said geographical position determining time slot, wherein said geographical position determining time slot is a time slot not used for traffic by said mobile terminal.

25. The system of claim 15, wherein the interrupted uplink communication is for mobile assisted handover (MAHO) measurements.

26. The system of claim 24, wherein said at least one uplink signal is transmitted on any frequency assigned to said serving base station.

27. The system of claim 15, wherein a start time and a stop time for said at least one uplink signal and a corresponding measurement are predetermined in order to minimize a system load.

28. The system of claim 27, wherein said start time and said stop time are defined by associated frame numbers.

29. A method for use in determining a geographical position of a mobile terminal in at least a TDMA or FDMA mobile radio system, comprising the steps of:

receiving in said mobile radio system a request to determine said geographical position;

ordering at least one base station to listen for a transmission from said mobile terminal and perform a measurement associated with said determining said geographical position;

sending an order from a serving base station to said mobile terminal to transmit at least one uplink signal, said at least one uplink signal primarily for use in said measurement associated with said determining said geographical position;

said mobile terminal transmitting said at least one uplink signal on a frequency assigned to said serving base station;

said at least one base station performing said measurement associated with said determining said geographical position; and wherein said at least one uplink signal comprises a handover access message.

30. The method of claim 29, wherein said handover access message specifies a handover to an already utilized channel.

31. The method of claim 29 or 30, wherein said uplink signal comprises at least two handover access messages responsive to a purposefully delayed acknowledgment to said uplink signal from said serving base station to said mobile terminal, said acknowledgment purposefully delayed in order for said at least one base station to receive additional uplink signals for use in performing measurements associated with said determining said geographical position.

32. The method of claim 31, wherein a purposeful delay is long enough for said mobile terminal to transmit a specified number of uplink signals, and after a time-out period, said mobile terminal reverts to a traffic channel utilized prior to said handover.

33. The method of claim 32, wherein said specified number of uplink signals is specified as a maximum number of uplink signals by a GSM radio air-interface specification.

34. A system for use in determining a geographical position of a mobile terminal in a mobile radio system, comprising:

means for receiving a request to determine said geographical position and ordering at least one base station to listen for a transmission from said mobile terminal;

a modified receiver, coupled to said at least one base station, for performing a measurement associated with said determining said geographical position;

a serving base station operable to send an order to said mobile terminal to transmit at least one uplink signal, said at least one uplink signal primarily for use in said measurement associated with said determining said geographical position;

said mobile terminal operable to transmit said at least one uplink signal on a frequency assigned to said serving base station; and wherein said at least one uplink signal comprises a handover access message.

35. The system of claim 34, wherein said handover access message specifies a handover to an already utilized channel.

36. The system of claim 34 or 35, wherein said uplink signal comprises at least two handover access messages responsive to a purposefully delayed acknowledgment to said uplink signal from said serving base station to said mobile terminal, said acknowledgment purposefully delayed in order for said at least one base station to receive additional uplink signals for use in performing measurements associated with said determining said geographical position.

37. The system of claim 36, wherein a purposeful delay is long enough for said mobile terminal to transmit a specified number of uplink signals, and after a time-out period, said mobile terminal operable to revert to a traffic channel utilized prior to said handover.

38. The system of claim 37, wherein said specified number of uplink signals is specified as a maximum number of uplink signals by a GSM radio air-interface specification.

* * * * *

UNITED STATES PATENT AND TRADEMARK OFFICE
CERTIFICATE OF CORRECTION

PATENT NO. : 6,064,888
DATED : May 16, 2000
INVENTOR(S) : Lundquist et al.

It is certified that error appears in the above-identified patent and that said Letters Patent is hereby corrected as shown below:

Column 6,
Line 32, replace "unlink" with -- uplink --

Column 8,
Line 45, replace "unlink" with -- uplink --
Line 46, replace "unlink" with -- uplink --

Signed and Sealed this

Twenty-third Day of October, 2001

Attest:

*Attesting Officer*

NICHOLAS P. GODICI
*Acting Director of the United States Patent and Trademark Office*